No. 705,175. Patented July 22, 1902.
C. H. WHEELER & F. W. KREMER.
VEHICLE TIRE.
(Application filed July 19, 1901.)
(No Model.)
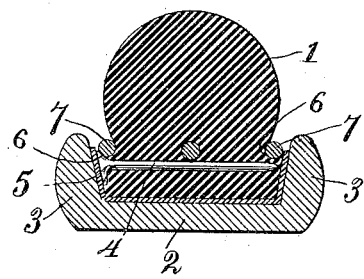
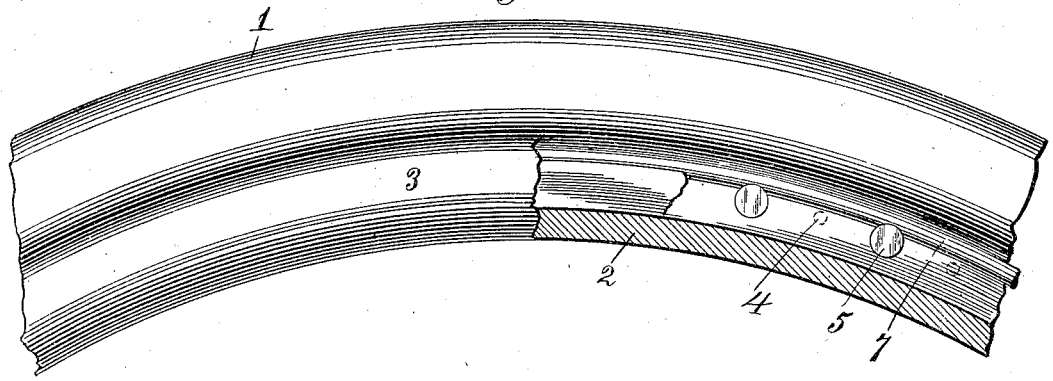
WITNESSES:
John H. Barnes
Ralph L. Kelly
INVENTORS
Chas. H. Wheeler and
Franklin W. Kremer
BY
Ernest Hopkinson
their ATTORNEY

UNITED STATES PATENT OFFICE.

CHARLES H. WHEELER AND FRANKLIN W. KREMER, OF AKRON, OHIO; SAID WHEELER ASSIGNOR TO THE INDIA RUBBER COMPANY, OF AKRON, OHIO, A CORPORATION OF OHIO.

VEHICLE-TIRE.

SPECIFICATION forming part of Letters Patent No. 705,175, dated July 22, 1902.

Application filed July 19, 1901. Serial No. 68,886. (No model.)

*To all whom it may concern:*

Be it known that we, CHARLES H. WHEELER, residing at No. 208 Silver street, and FRANKLIN W. KREMER, residing at No. 100 Rosedale avenue, city of Akron, county of Summit, and State of Ohio, citizens of the United States, have invented a new and useful Improvement in Vehicle-Tires, of which the following is a specification.

The present invention relates to rubber vehicle-tires, and especially to solid rubber vehicle-tires, which are secured to a wheel-rim by means of binding-wires.

The invention has for its object to provide in a solid rubber vehicle-tire a plurality or series of transverse cross-pieces of such character and so disposed as to practically preclude the liability of the tire being dislodged from the channel by reason of any strong lateral torsion, as by twisting out of a cartrack or turning corners.

In the drawings there is illustrated a construction embodying the features of our invention.

In said drawings, Figure 1 is a transverse section of a tire and channel; and Fig. 2 is a longitudinal view, partly in side elevation and partly in central vertical section.

Like numerals of reference refer to like parts throughout both views of the drawings.

In said drawings, 1 designates the rubber tire, which may be of any desired form so long as it is provided with a suitable basepiece fitting in a corresponding channel or channel-groove.

2 designates the channel, which is of the usual trough-shaped cross-section and having outwardly-flaring side flanges 3.

4 designates the transverse cross-pieces, each of which is provided at one end with a head 5. These cross-pieces are embedded in the base of the tire, the headpiece preferably consisting of a flat circular disk, the outer face of which is substantially flush with the side of the base-piece of the tire, the points preferably reaching and projecting underneath the binding-wire on the other side of the tire. Preferably the cross-pieces will be located in such manner that succeeding cross-pieces will be oppositely disposed and alternate cross-pieces similarly disposed with relation to the headed ends, so that the heads of alternate cross-pieces will be located on the same side of the tire. On each side of the tire are provided circumferential grooves 6, in each of which is located a circumferential binding-wire 7. These binding-wires may be drawn taut and secured in any suitable manner and by any desired means.

The advantages of a tire made according to our invention are that the heads of the transverse base-pieces form locking projections within which the binding-wires are located, these heads preventing the displacement of the tire from underneath the binding-wire and anchoring the whole base of the tire securely in position. The heads of the transverse pieces are slightly at an angle to the bodies thereof, so that they may lie parallel or in contact with the side channels without having the pointed end of the cross-piece project up too much under the opposite binding-wire.

Besides the foregoing advantages it results from providing the cross-pieces with heads only at one end that the cross-pieces are maintained in proper position during the vulcanization process, the fluid or pasty rubber during vulcanization exerting pressure on the inside of the head to maintain its face parallel with the side wall of the mold. If the cross-piece were provided with a head at both ends, this effect would be neutralized.

If desired, the tire may also be secured by one or more internal binding-wires. In the drawings we have shown a construction having one central binding-wire.

What is claimed as new is—

1. A rubber vehicle-tire having cross-pieces embedded in the base portion thereof, each cross-piece being provided with a head at one end only, the outer surface of the head being substantially flush with the side of the rubber tire; substantially as described.

2. A rubber vehicle-tire having cross-pieces embedded in the base portion thereof, each cross-piece provided with a head at one end only, the body of the head lying within the rubber of the tire; substantially as described.

3. A rubber vehicle-tire having cross-pieces embedded in the base portion thereof, each cross-piece provided with a head oblique to its body portion and its outer surface substantially flush with the side of the rubber tire; substantially as described.

4. A rubber vehicle-tire having cross-pieces embedded in the base portion thereof, each cross-piece provided with a head at one end only, the body of the head lying within the rubber of the tire, and a circumferential binding-wire located on each side of the tire; substantially as described.

5. A vehicle-tire provided with cross-pieces, said cross-pieces being located in the base of the tire, and each provided with a head at one end only, said head being oblique to the body of the cross-piece and parallel with the side wall of the tire, and a circumferential binding-wire on each side of the tire and located within the headed portion of the cross-pieces, substantially as specified.

In testimony whereof we have hereunto set our hands in the presence of two subscribing witnesses.

CHARLES H. WHEELER.
FRANKLIN W. KREMER.

Witnesses:
C. MACDONALD,
RICHARD WARD.